United States Patent [19]
Morisak

[11] Patent Number: 6,053,282
[45] Date of Patent: Apr. 25, 2000

[54] PORTABLE DEER STAND

[76] Inventor: Gary L. Morisak, 11019 Dyson, Houston, Tex. 77041

[21] Appl. No.: 09/411,715

[22] Filed: Oct. 4, 1999

[51] Int. Cl.⁷ .................................................. A01M 31/00
[52] U.S. Cl. ........................................... 182/115; 182/129
[58] Field of Search ..................... 182/187, 115, 182/129, 116; 139/901; 248/168, 165

[56] References Cited

U.S. PATENT DOCUMENTS

| | | | |
|---|---|---|---|
| D. 399,365 | 10/1998 | Sieland | D6/416 |
| 3,967,694 | 7/1976 | Woofolk | 182/115 |
| 4,937,965 | 7/1990 | Navaez | 42/94 |
| 5,253,732 | 10/1993 | Daniels | 182/100 |
| 5,485,978 | 1/1996 | Hernandez | 248/165 |
| 5,857,748 | 1/1999 | Knight | 297/451.2 |

*Primary Examiner*—Alvin Chin-Shue
*Attorney, Agent, or Firm*—William J. Beard

[57] ABSTRACT

A lightweight portable deer stand which is hand transportable by a single hunter is provided. The deer stand has a platform member to which are attached three pivotally mounted foldable legs. The platform member also carries a fixed stable axis of rotation to which a chair having a back and a seat and a gun rail/rest member may be detachably mounted upon. A separate sun/rain cover member may be detachably mounted to the chair. The platform itself is formed of a very lightweight open rod design. The entire deer stand apparatus may easily be taken apart or put together without the use of any tools.

10 Claims, 1 Drawing Sheet

6,053,282

PORTABLE DEER STAND

FIELD OF THE INVENTION

This invention generally relates to deer stands useful in elevating and concealing a hunter. More particularly, this invention relates to lightweight, portable, deer stands useful in bow hunting or firearms hunting in a variety of terrain.

BACKGROUND OF THE INVENTION

Deer hunting is a very popular sport, pastime or even a way of life in large parts of the United States. Where the use of dogs is prohibited, the deer hunt has evolved into setting up a "stand" or "hide" in places where deer are likely to be found, such as by "scrapes", along deer trails or near a feeder (where legal) etc. Since the deer hunter may from time to time wish to change from one location to another, portable deer stands of some type have proven to be desireable.

BACKGROUND OF THE PRIOR ART

Portable deer stands have been developed for use on the ground or in an elevated position. Where the terrain features available trees, "tree stands" have become popular because of their relative light weight, easy portability and relative ease of setup. U.S. Pat. Nos. 4,730,700 and 5,052,516 typify this type of portable deer stand. However trees are not always readily available, particularly trees of size and height to support a hunter at a useful elevation (from 6 feet to 12 feet above ground level). In such instances portable (sometimes by a vehicle because of weight) takedown stands such as that described in U.S. Pat. No. 5,327,993 have proven useful. This "portable" elevated stand is provided in take apart sections and has its bottom section equipped with wheels for enhancing its movement.

All of these types of prior art stands have their drawbacks and disadvantages, however. Tree stands, properly anchored to a sound tree are safe. However the act of "shinnying" up a tree while moving a portable tree stand can be very dangerous due to the possibility of falling from a significant height, particularly while carrying a loaded firearm. Even if trees of proper size are available, such tree stands, while light and portable are not desirable from a safety aspect. Tower type portable stands in the prior art are bulky, heavy, and require the use of tools of some type for their setup. All such disadvantages are desireably avoided.

BRIEF DESCRIPTION OF THE INVENTION

The foregoing undesirable features and disadvantages of prior art portable deer stands are completely avoided by the deer stand of the present invention. The deer stand of the invention is provided with a light weight, welded steel construction tripod leg mount having foldable legs for ease of transport. Legs of various heights, depending on the type of hunting terrain, can be used to elevate a top platform at any desired elevation for a particular terrain. The platform itself is of open light weight steel rod construction and receives the folding leg assembly integrally thereon. A molded, light weight, 360 degree rotatable chair seat and back for the hunter is provided and is detachable from the platform/leg assembly. It is attachable thereto without the use of any tools. A removable (optional) welded light weight steel gun rest or rail is also provided and can rotate with the chair. The rest or rail can also be attached to the platform/leg assembly without the use of any tools. Similarly, an optional sun/rain cover can be provided which attaches to and rotates with the 360 degree rotatable chair seat and back. The entire stand assembly of the invention is light enough to be carried in one hand by a hunter to a desired location in either trees or open, more arrid terrain and set up without tools in a matter of a few seconds. The foldable legs make ease of transport (legs folded) outstanding. Upon arrival at a desired location, the legs can be unfolded and staked down (if desired) and the seat/gun rail/cover assembly assembled in place entirely without tools of any type.

The invention is best understood by reference to the following detailed description thereof, taken together with the accompanying drawings.

It will be understood that these drawings are intended as illustrative only and not as limitative of the invention which may admit to other obvious variations to those of skill in the art.

DETAILED DESCRIPTION OF THE PREFERRED EMBODIMENT

Figure 1:
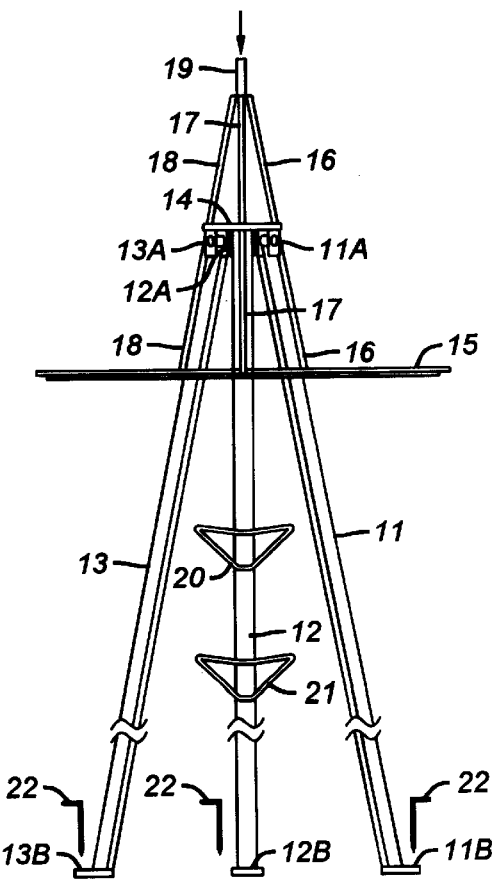
FIG. 1 is a schematic side view of the platform/leg assembly of the invention.

Referring initially to FIG. 1 a schematic side view of the folding leg/platform component of the deer stand system of the invention is given. Three legs 11, 12, 13 are pivotally connected at their upper ends to permanently attached (as by welding) steel hinges, 11A, 12A, and 13A via hinge pins. Hinges 11A, 12A, and 13A are affixed to a circular top plate 14 at 120 degree angles to each other about the periphery of the plate 14. Thus a very stable equilateral triangle tripod leg mount with the legs 11, 12, 13 able to move pivotally inward or outward from each other. When the tripod legs are moved outwardly from each other, their outward movement is limited and stoppedby contact with platform member 15 which is attached permanently (as by welding) to plate 14 via suspension members 16, 17 and 18. The suspension members 16, 17 and 18 may be steel rods, such as used in reinforcing concrete if desired, and may admit of different sizes and weights to support various loads.

Figure 3:
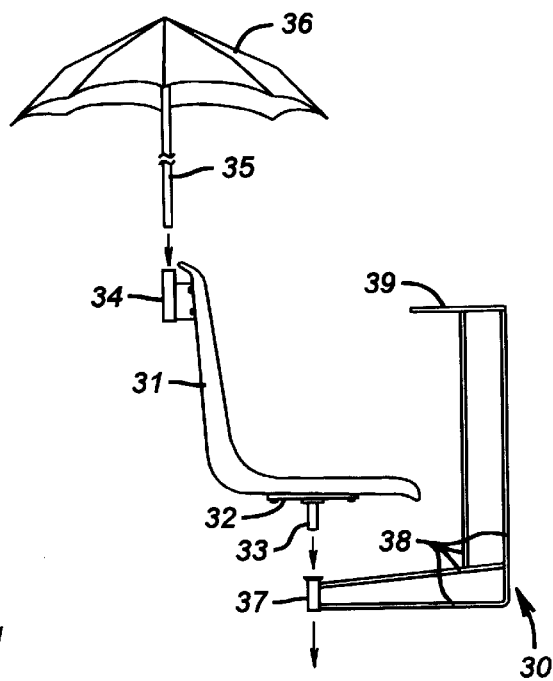
FIG. 3 is an exploded schematic view showing the chair seat back/gun rest rail/sun and rain cover components and their ease of assembly onto the platform/leg assembly.

The suspension members 16, 17 and 18 extend upwardly at angles toward each other to a point where they meet and are joined permanently together and to an upright support rod member 19 which extends upwardly above their juncture and is sized to be inserted into one or more axially shaped receptacle members such as 33 and 37 of FIG. 3. Thus support rod member 19 becomes a rotational axis for the detachable assemblies shown in FIG. 3.

Figure 2:
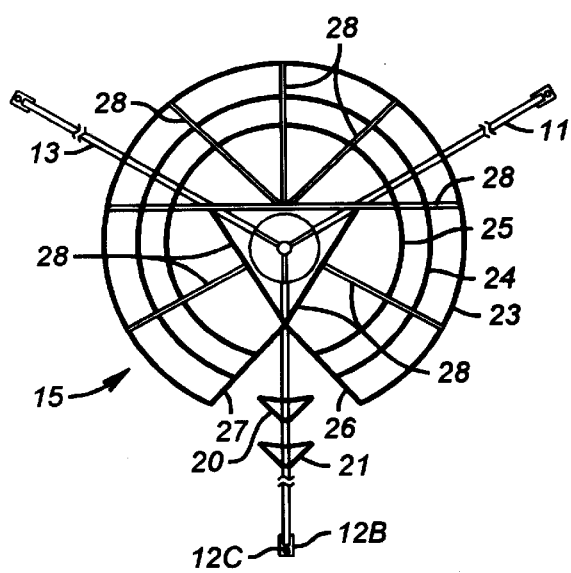
FIG. 2 is a schematic top view of the platform itself and one leg.

One of the leg members 12, all of which may comprise, for example, hollow thin walled steel conduit of square or round cross section, is provided with a plurality of climbing steps 20, 21.Additionally, each leg member 11, 12 and 13 is provided at its lower end with a resting plate or foot 11B, 12B, and 13B which are affixed thereto permanently. Holes (not shown for legs 11 and 13) such as 12C of FIG. 2 are provided in foot members 11B, 12B and 13B so that they may be staked to the ground by stakes 22 driven through them. Thus, the tripod legs provide a very stable support for platform 15 and upright rod member 19 and are hingedly affixed thereto for ease of transport.

Referring now to FIG. 2 a schematic top view of platform member 15 is shown. The platform 15 is formed of generally circular bent rod stock pieces having different diameters, such as 23, 24 and 25. The opposite ends of rod pieces 23, 24 and 25 are permanently joined to each other at spaces as shown by end rod pieces 26 and 27. To insure desired rigidity to platform 15, further cross and diagonal rod piece braces 28 are welded together in the pattern shown in FIG. 2, if desired. The equilateral triangle inner opening formed by rods 28 is functional to limit the outward pivotal movement of legs 11, 12 and 13 when they come into contact with it when moved apart outwardly.

Referring now to FIG. 3 a light weight one piece (such as molded fiberglass) chair shell 31 is provided with a permanently attached pivotal mount 33 which is welded to a base plate 32, also permanently attached (as by bolts and nuts) to the chair 31. Pivotal mount 33 can be simply a closed ended steel cylinder sized to fit onto or into support rod 19 of FIG. 1. If desired a rail/gun rest member shown generally at 30 is also provided. Rest member 30 is comprised of bar stock or light weight steel tubing welded to curved support structure 38 and which is mounted in a cantilever fashion to a hub 37 or cylindrical receptacle in a permanent fashion (as by welding). Hub 37 has a cylindrical shape with a bore there through for receiving support rod 19.

The chair member 31 is provided on its upright or back portion surface with a receptacle 34 having a bore there through sized to receive an umbrella type sun/rain cover 36 which has a mounting standard 35 fitted to receptacle 34. The arrows 40 illustrate how the chair seat member 31 and the rest member 30 are simply slipped onto the upright support rod 19 to form a complete deer stand assembly without the use of any tools.

The fore going descriptions are illustrative and not limitative of the invention for it may be apparent to those of skill in the art to make changes which fall within the true spirit and scope of the invention. It is the intent of the appended claims to cover all such changes and modifications rendered apparent by the disclosure.

What is claimed is:

1. A light weight portable deer stand apparatus transportable by one person by hand, comprising:

an upright leg/platform member having three or more legs hingedly attached to a support plate and capable of pivotal movement away from or toward each other;

a platform permanently suspended from and below said support plate and forming a stable plane for supporting a hunter's weight, and being formed in an open configuration by steel rod members shaped and welded together;

said support plate carrying permanently attached to its upper side at least one upright support rod forming a stable axis for rotation above said platform; and a chair shell member having means for rotatably mounting on said upright support member and capable of 360 degree rotation about said stable axis.

2. The apparatus of claim 1 and further including a gun rest/rail member.

3. The apparatus of claim 2 and further including wherein said gun rest rail member is fixedly attached to said chair member.

4. The apparatus of claim 1 and further including a sun/rain cover member.

5. The apparatus of claim 4 wherein said sun/rain cover member is attached to said chair shell member.

6. The apparatus of claim 5 wherein said sun/rain cover member is of the umbrella type.

7. The apparatus of claim 1 wherein said platform member has an equilateral tripod leg mount.

8. The apparatus of claim 7 wherein said mount legs are pivotally mounted on hinge mounts.

9. The apparatus of claim 8 wherein one of said legs is provided with integral set of climbing steps.

10. The apparatus of claim 9 wherein each of said legs is also provided with a foot member.

* * * * *